UNITED STATES PATENT OFFICE.

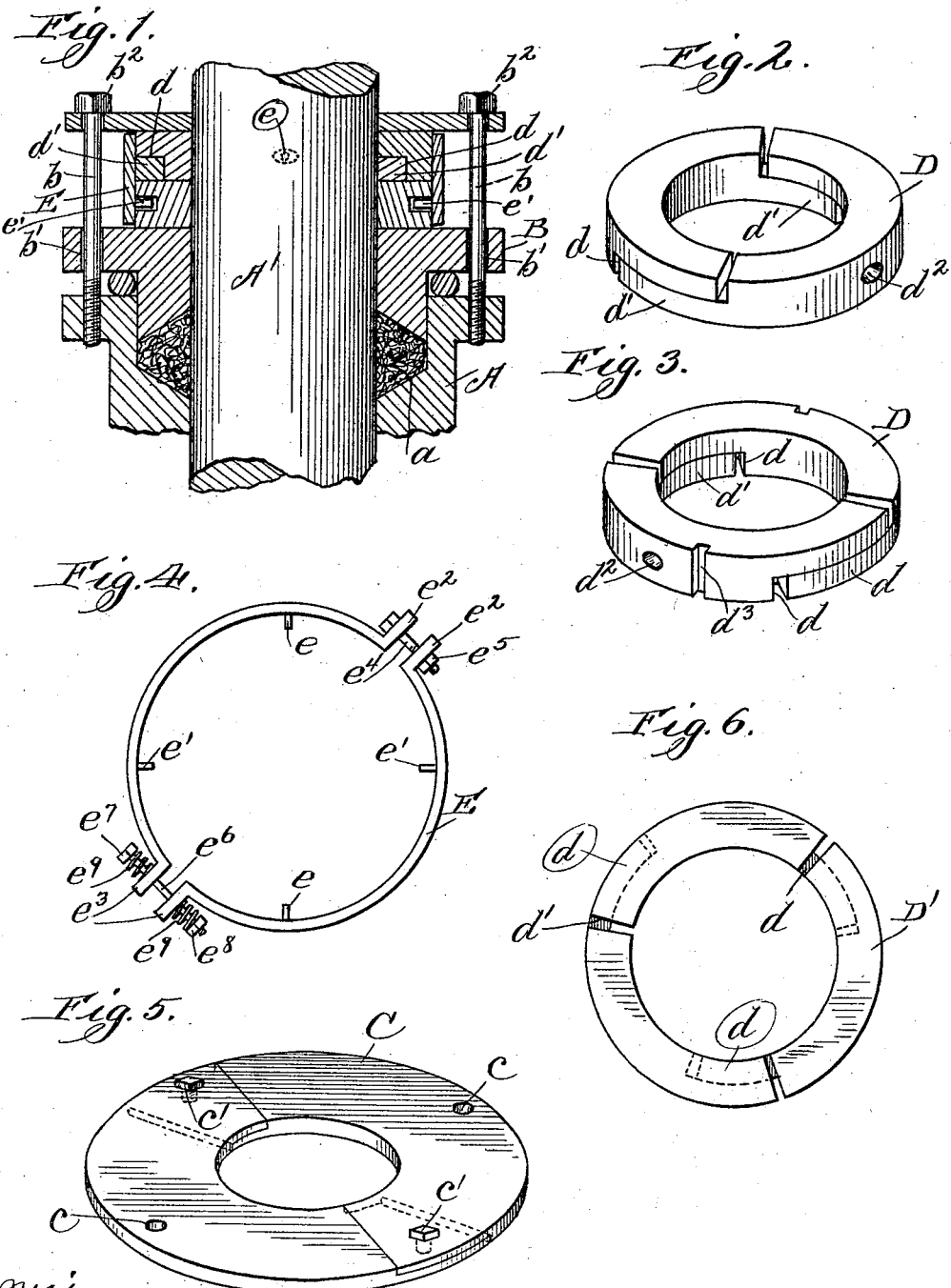

JOHN W. DUDLEY, OF CHICAGO, ILLINOIS, ASSIGNOR TO JOHN C. WILLIAMS, OF SAME PLACE.

METALLIC PACKING.

SPECIFICATION forming part of Letters Patent No. 616,867, dated December 27, 1898.

Application filed January 17, 1898. Serial No. 666,905. (No model.)

*To all whom it may concern:*

Be it known that I, JOHN W. DUDLEY, a citizen of the United States, residing at Chicago, in the county of Cook and State of Illinois, have invented certain new and useful Improvements in Metallic Packing, of which the following is a specification.

This invention relates to an improved metallic packing for piston-rods and other reciprocating parts of machinery, as well as for rotary shafts or any part of a machine where steam might escape; and it consists in certain peculiarities of the construction, novel arrangement, and operation of the various parts thereof, as will be hereinafter more fully set forth and specifically claimed.

Heretofore it has generally been the custom in using metallic packing to locate it within a stuffing-box and to retain it there by means of a gland or follower held in position by means of bolts or screws engaging the flanges of the follower and stuffing-box. When so arranged, it was difficult to assemble the parts comprising the packing, and in the event of repairing the same it necessitated the removal of the gland from the stuffing-box. In my present invention I overcome these objections by locating my metallic packing on the exterior of the gland, in which position access thereto may be easily gained and the parts thereof readily adjusted or repaired when required. Other objects and advantages will appear in the description hereinafter contained.

In order to enable others skilled in the art to which my invention pertains to make and use the same, I will now proceed to describe it, referring to the accompanying drawings, in which—

Figure 1 is a sectional view, partly in elevation, of a portion of a stuffing-box and part of a piston-rod or shaft therein, illustrating my packing in position on the exterior of the stuffing-box. Figs. 2 and 3 are perspective views of the sectional rings comprising my packing. Fig. 4 is a detached plan view of the securing or adjusting ring or band. Fig. 5 is a perspective view of the securing-plate; and Fig. 6 is a plan view of one of the sectional rings, illustrating a modification.

Similar letters refer to like parts throughout the different views of the drawings.

A represents a stuffing-box of the ordinary or any preferred construction, which is formed with a cylindrical opening to receive the piston-rod or shaft A' and around this opening with a cavity or chamber $a$ for the reception of waste packing, which may be saturated with oil or other suitable lubricant. In the cavity or chamber of the stuffing-box is located a gland B, through which the piston-rod or shaft A' also passes. This gland is secured to the stuffing-box by means of screw-bolts $b$, which pass through suitable openings $b'$ in the gland near its periphery and engage screw-threaded openings in the stuffing-box, the outer ends of the bolts $b$ being provided with heads $b^2$ to rest on and against the follower or securing-plate C, which is provided with openings $c$ near its periphery for the reception of said bolts and is preferably made in two pieces, which are secured together by means of screws $c'$, as is clearly shown in Fig. 5 of the drawings. Located on the exterior of the follower B are one or more sectional rings D, which comprise my packing, and may be formed, as shown in Figs. 2 and 3, of two semicircular pieces having at their alternate ends recesses $d$ and projections or extensions $d'$ to fit therein or may be constructed of three circular pieces, as shown in Fig. 6 of the drawings, in which construction two of the recesses $d$ are located at the inner periphery of the ring, while the other recess is located on the outer periphery thereof, and it will be noticed in Figs. 1 to 3, inclusive, of the drawings that one of the recesses $d$ in the rings D is located at the outer periphery of the ring, while the other is in the inner periphery thereof; but in making my packing I do not desire to be limited to the aforesaid location of the recesses for the reception of the extensions $d'$, as I may locate them all on the interior of the ring or on the outside thereof or one or more on the interior or exterior, as desired. In the outer surfaces of the pieces composing the sectional rings are formed openings $d^2$ for the reception of the dowel-pins $e$ and $e'$ on the inner surface of the securing or adjusting band E, which is preferably made of two pieces, as shown in Fig. 4 of the drawings, and is placed around the sectional rings composing the packing. The openings $d^2$ in the sectional rings are slightly oblong, as shown, to permit of the adjustment of said pieces when the securing-ring is tightened thereon. Instead of using the openings $d^2$ I may, however, form slots $d^3$ within the outer surfaces of the pieces composing the sectional rings, in which case the said slots shall be large enough to allow of slight "play" or movement of the dowel-pins on the securing-band. Ordinarily two of the sectional rings are employed to form the packing and are located one on the other, so that the joints therein will be broken, as shown in Fig. 1 of the drawings, and when so located the dowel-pins $e'$ will engage the sections of the lower ring, while the pins $e$ will engage those of the upper ring, and for this purpose the pins $e$ are located near the upper portion of the band E, while the pins $e'$ are in its lower portion and about ninety degrees from each other, as shown; but when the rings D', composed of three sections, are used the band E should be provided with three pins near its lower portion and three near its upper part to engage the several sections of the rings and to so hold them that their joints will be broken. The securing ring or band E is formed of two semicircular pieces having at their ends outwardly-turned parts $e^2$ and $e^3$, through the former of which is passed a bolt $e^4$, having on its end a screw-nut $e^5$ to clamp said portions together. Passing through the parts $e^3$ is another bolt $e^6$, which has on one end a head $e^7$ and on its other end a screw-nut $e^8$, between which and the projections $e^3$ are located springs $e^9$, the tension of which may be regulated by means of the screw-nut $e^8$, and thus adjust the band to the sectional rings as desired.

Having thus fully described my invention, what I claim as new, and desire to secure by Letters Patent, is—

The combination with a disk or gland encircling the shaft or rod, of a series of sectional rings encircling the shaft or rod, and having in the alternate ends of the sections recesses and extensions to fit in said recesses and provided in their outer surfaces with enlarged openings to receive dowel-pins on the securing-band, the said securing-band composed of two pieces, having two of their ends adjustably secured together and their opposite ends adjustably secured together and spring-actuated, and provided with a number of pins located near its lower portion, and other pins located near its upper part to engage the openings in the sectional rings, and a securing-plate or follower encircling the rod or shaft and resting on the outer sectional ring, and having means to adjustably secure it in position, substantially as described.

JOHN W. DUDLEY.

Witnesses:
CHAS. C. TILLMAN,
JOHN S. WARD.